United States Patent [19]

Reynolds

[11] Patent Number: 4,813,236
[45] Date of Patent: Mar. 21, 1989

[54] MASTER CYLINDER

[75] Inventor: Desmond H. J. Reynolds, West Midlands, Great Britain

[73] Assignee: Lucas Industries, Birmingham, United Kingdom

[21] Appl. No.: 71,391

[22] Filed: Jul. 9, 1987

[30] Foreign Application Priority Data

Jul. 9, 1986 [GB] United Kingdom ................. 8616677

[51] Int. Cl.[4] .............................................. F15B 7/08
[52] U.S. Cl. ........................................ 60/585; 60/533; 92/170; 92/171
[58] Field of Search .................... 60/585, 533; 92/170, 92/171, 169.2

[56] References Cited

U.S. PATENT DOCUMENTS

| 4,276,994 | 7/1981 | Spalding | 60/533 |
| 4,449,446 | 5/1984 | Degnan | 92/171 |
| 4,474,005 | 10/1984 | Steer | 60/585 |
| 4,495,772 | 1/1985 | Furuta | 92/171 |
| 4,505,112 | 3/1985 | Nakamura | 60/585 |

Primary Examiner—Edward K. Look
Attorney, Agent, or Firm—Staas & Halsey

[57] ABSTRACT

A master cylinder includes a pressure cylinder and a pressure-generating piston movable therein. The cylinder is closely surrounded over part of its length by a separate reinforcing member in the form of a sleeve which acts to prevent significant expansion of the cylinder under the effect of internally applied pressure. In the example shown, the pressure cylinder forms part of an integral moulding which includes a fluid reservoir.

9 Claims, 1 Drawing Sheet

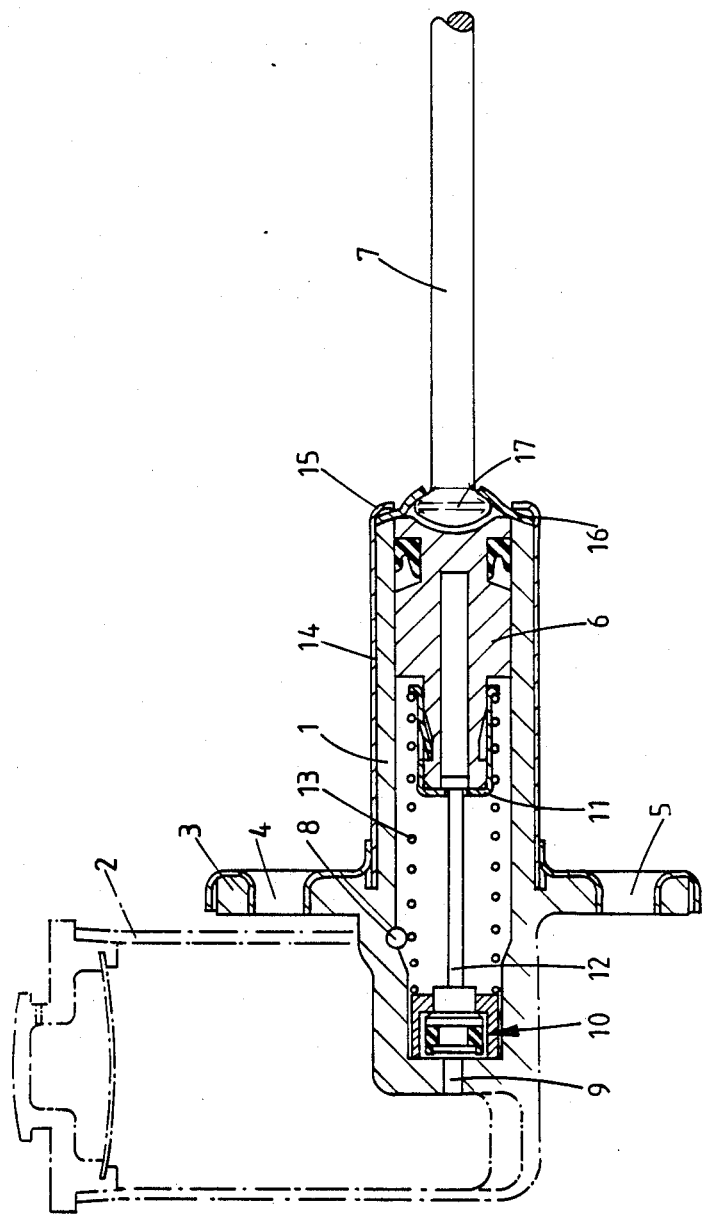

MASTER CYLINDER

This invention relates to a master cylinder, primarily for use in a vehicle hydraulic clutch or brake actuating system, and having a pressure cylinder moulded from plastics material, usually integrally formed with a reservoir, and a pressure generating piston movable therein.

Because of the relatively low stiffness of the polymer-based plastics materials from which master cylinders can be successfully moulded, the generation in the pressure cylinder of high pressure, such as that experienced in a vehicle clutch or brake actuating system, causes unacceptable swelling of the cylinder bore with a consequent reduction in the necessary interference between the piston seal and internal cylinder wall, giving rise to a possible lack of seal integrity and risk of fluid leakage. Increasing the wall thickness of the moulded pressure cylinder to increase its pressure-sustaining capability is not a satisfactory solution to the problem because it can create severe differences between the thickness of different parts of the moulding, leading to differential shrinkages occurring, during cooling, between parts of the moulding of different thicknesses. This can make it difficult to achieve the necessary dimensional accuracy in the moulding.

An object of the present invention is to provide a master cylinder having a pressure cylinder of plastics material which can sustain higher operating pressures than conventional cylinders of this type without a significant increase in cylinder wall thickness, and which may also be manufactured to the required degree of accuracy by conventional moulding techniques.

According to the present invention, a master cylinder comprises a pressure cylinder of plastics material and a pressure-generating piston movable therein, the outer surface of the cylinder being closely surrounded, over at least that part of the length of the cylinder traversed by the piston during its actuating travel, by a separate reinforcing member which acts to prevent significant expansion of the cylinder under the effect of internally applied pressure.

The pressure cylinder may conveniently form an integral part of a moulding which includes a fluid reservoir.

In a convenient practical arrangement, the cylinder is formed with a generally transversely projecting mounting flanges and the reinforcing member extends into reinforcing engagement with the flange. Said member may conveniently provide an abutment for engagement by a retainer for a piston actuating rod extending into the cylinder, such retainer preferably also acting as an abutment for the piston in its retracted position.

The invention will now be described, by way of example, with reference to the single accompanying drawing which is a side view, partly in longitudinal cross-section, of one form of the master cylinder of the invention.

The master cylinder illustrated in the drawing has a hollow tubular portion 1 serving as a pressure cylinder and formed as a one-piece moulding with a reservoir 2, the cylinder 1 being provided with a radially extending flange 3 for mounting the master cylinder on fixed structure such as a vehicle bulkhead, for which purpose the flange is provided with a pair of holes 4, 5 through which fixing bolts or the like may be passed, in conventional manner. The cylinder 1 contains a pressure piston 6 slidable therein under the action of an actuating rod 7 to transmit fluid pressure to, in this case, a vehicle clutch, via an outlet port 8. A fluid inlet port 9 provides communication between the reservoir 2 and cylinder 1 and fluid flow therethrough is controlled by means of a conventional centre valve, indicated generally at 10, actuated by the piston 6 via a cup member 11 attached to the piston and co-operating with a valve actuating rod 12. The valve 10 is normally held in its open position by the piston 6 via the rod 12 when the piston is in its retracted position, forward movement of the piston, when actuated, permitting the valve to close in conventional manner in order to allow pressure to be established within the cylinder 1.

The cylinder 1 is closely surrounded by a reinforcing sheath 14, which may conveniently be of metal or other relatively stiff material such as hardened plastics or plastics reinforced with plastic or metal fibre for example. The sleeve is turned inwardly beyond the open end of the cylinder to form a shoulder 15 which acts as a retaining abutment for a retainer 16 co-operating with an enlarged end portion 17 of the rod 7 to retain the rod within the the cylinder. The reinforcing member also extends radially to cover the adjacent face of the flange 3 and into the holes 4, 5 in order to provide reinforcement for the flange. The reinforcing member may either be fabricated, as shown, with the radially extending portion secured in convenient manner to the cylindrical portion surrounding the pressure cylinder, or it may be integrally formed, as for example by pressing. The reinforcing member may conveniently be retained in position on the plastic cylinder and/or flange by adhesion, i.e. glueing or bonding, or may be a tight interference fit on the cylinder. The reinforcing member will also be held in position, in situ, by the fixing bolts passing through the flange 3.

The position of the flange 3 along the cylinder may be varied as desired, but will preferably be beyond the swept part of the cylinder bore so that any distortion occurring at the junction between the flange and cylinder will be unlikely to affect the sealing integrity of the piston. The illustrated position adjacent the reservoir can be advantageous, when used on a brake master cylinder, since it permits a relatively long rearwardly extending portion of the cylinder to be accommodated within a servo-booster, leading to a compact arrangement.

The reinforcing member may take various forms, one alternative example being a spiral coil formation.

I claim:
1. A master cylinder comprising:
    a pressure cylinder of plastic material having an inner surface, an outer surface and an end wall;
    a pressure-generating piston movable in said pressure cylinder engaging the inner surface of said pressure cylinder and defining with the inner surface and the end wall a pressure chamber; and
    a separate reinforcing member which surrounds the outer surface of said cylinder over at least that part of the length of said cylinder traversed by said piston during its actuating travel so that significant expansion of the cylinder due to internally applied pressure is prevented, said reinforcing member providing an abutment for engagement by a retainer for a piston actuating rod extending into said cylinder.
2. A master cylinder according to claim 1 wherein the pressure cylinder forms an integral part of a moulding which includes a fluid reservoir.

3. A master cylinder according to claim 1 wherein the cylinder is formed with a generally transversely projecting mounting flange and the reinforcing member extends into reinforcing engagement with the flange.

4. A master cylinder according to claim 3 wherein the flange is provide with through openings for the passage of fixing elements and the reinforcing member extends into said openings so as to line at least a portion of each opening.

5. A master cylinder according to claim 3 wherein said flange is closely adjacent the reservoir.

6. A master cylinder according to claim 1 wherein said retainer acts also as an abutment for the piston in its retracted position.

7. A master cylinder according to claim 1 wherein the reinforcing member is turned inwardly beyond the open end of the cylinder to form a shoulder acting as said abutment.

8. A master cylinder according to claim 1 wherein the reinforcing member is retained in position by adhesion.

9. A master cylinder according to claim 1 wherein the reinforcing member is an interference fit on the cylinder and thereby retained thereon.

* * * * *